United States Patent [19]
Goldman

[11] 3,891,830
[45]* June 24, 1975

[54] CREDIT VERIFICATION SYSTEM

[75] Inventor: Robert N. Goldman, Pacific Palisades, Calif.

[73] Assignee: Telecredit, Inc., Los Angeles, Calif.

[ * ] Notice: The portion of the term of this patent subsequent to Oct. 5, 1988, has been disclaimed.

[22] Filed: Oct. 12, 1973

[21] Appl. No.: 406,063

Related U.S. Application Data

[63] Continuation of Ser. No. 150,601, June 7, 1971, abandoned, which is a continuation-in-part of Ser. No. 558,127, June, 1966, Pat. No. 3,610,889.

[52] U.S. Cl. ......... 235/61.7 B; 235/61.11 D; 194/4; 200/46; 222/2; 340/149 A; 360/2
[51] Int. Cl. ...... G06k 7/08; G11b 1/06; G07f 1/06; B67d 5/10; H01h 43/08
[58] Field of Search . 235/61.7 B, 61.11 E, 61.11 D, 235/61.11 A, 61.11 R, 61.11 B, 61.12 M; 194/4; 200/46; 340/149 A, 149 R; 250/569; 360/2; 222/2

[56] References Cited
UNITED STATES PATENTS

| | | | |
|---|---|---|---|
| 3,015,087 | 12/1961 | O'Gorman | 340/149 A |
| 3,039,582 | 6/1962 | Simjian | 194/4 |
| 3,097,347 | 7/1963 | Simjian | 340/149 R |
| 3,221,304 | 11/1965 | Enikeieff | 340/149 A |
| 3,344,258 | 9/1967 | Michels | 235/61.7 B |
| 3,378,826 | 4/1968 | Gabor | 235/61.11 D |
| 3,457,391 | 7/1969 | yamamoto | 340/149 A |
| 3,513,298 | 5/1970 | Riddle | 235/61.11 D |

*Primary Examiner*—Daryl W. Cook
*Assistant Examiner*—Robert M. Kilgore
*Attorney, Agent, or Firm*—Nilsson, Robbins, Bissell, Dalgarn & Berliner

[57] ABSTRACT

A credit verification system for use with identification cards carrying a changeable recording medium is disclosed. On presentation, cards are sensed to provide signals indicative of identification and an aggregate amount of all value transactions supported by the card during a period (month) when the card was last presented. The system develops signals indicative of an amount of value (including the contemplated transaction) supported by the card during the instant period and tests that amount against a standard that is variable by data from a record medium, which also carries identifications for unacceptable cards. Approval is indicated providing the card is acceptable and the imposed limits are not exceeded.

17 Claims, 7 Drawing Figures

CREDIT VERIFICATION SYSTEM

This is a continuation, of application Ser. No. 150,601, filed Jun. 7, 1971, now abandoned; which is a continuation-in-part of Ser. No. 558,127, filed June 1966, now U.S. Pat. No. 3,610,889, by the present inventor and entitled Identification Card Control System.

BACKGROUND AND SUMMARY OF THE INVENTION

Various forms of identification cards or credit cards have come into exceedingly widespread use to designate the owner as a person to whom credit may be extended. These cards have been successful largely because they enable the owner to avoid carrying significant amounts of cash. However, the use of the cards and similar devices, has not been without certain attendant difficulties. For example, the owner of a credit card may become irresponsible due to financial reverses, whereupon he may incur a large indebtedness based on his credit card, which indebtedness may not be recoverable.

Another problem in the use of cards, plates, and other devices employed to identify a person for credit, stems from the loss of such devices. That is, the owner of a credit card may lose his card or it may be stolen, whereupon an unauthorized bearer may make large purchases supported by the credit card. Generally, in such a situation, either the owner of the credit card or the issuing organization incurs a substantial loss.

In view of these difficulties, some attempts have been made to control the use of credit cards. For example, it has been proposed to utilize a computer which maintains a current balance for each issued credit card. A warning is then provided in the event a credit card is used to excess. However, in general, systems of this type have not come into widespread use for several reasons. First, the requisite computer is inherently expensive, both in acquisition and in maintenance. Second, it is a requirement of the system that upon each presentation of the credit card, communication must be established with the computer. As a result, the usability of the card must be quite restricted or the necessary communication system reaches impractical proportions.

Therefore, considerable need exists for a practical system, for use in cooperation with credit cards and related devices, which system may be effectively employed to control the use of these devices and thereby minimize financial loss, both to the persons to whom the cards are assigned (owners) and to the issuing organization. In this regard, the present invention is based upon the recognition of the significance of time or discrete time intervals as a factor in controlling the use of a credit card. That is, the present invention contemplates control of identification devices based on use of such devices as related to a particular interval of time and has widespread application in conjunction with many different types of devices.

The system of the present invention may be used in cooperation with an identification card or the like, which bears a recording medium thereon, and which system incorporates a register that is set to indicate a predetermined interval of time, and further includes means for sensing the recording medium on the card to provide an indication of the last time when the card was employed; and which system may further include means for more-precisely indicating the extent of use during the interval of last use and verifying the card number against a recorded list.

DETAILED DESCRIPTION OF THE ILLUSTRATIVE EMBODIMENT

Figure 1:
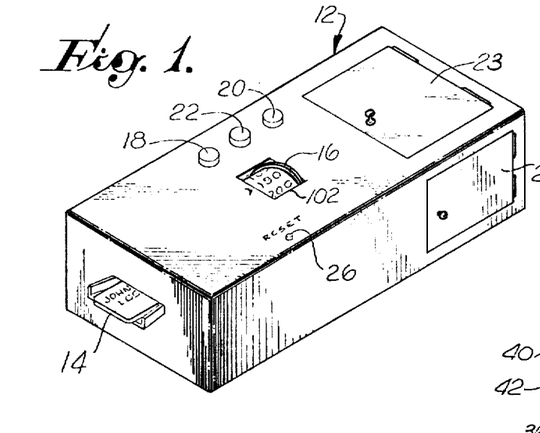
FIG. 1 is a perspective view of a unit incorporating the system of the present invention.

Referring initially to FIG. 1, a unit 12 of the present invention is shown receiving a cooperating identification card 14 for evaluation. The unit 12 indicates a value, e.g., dollar amount, through a window 16, indicating a contemplated purchase. In general, a customer (card bearer) is authorized to purchase a predetermined dollar value of goods and services over a specified period. For example, during any given month, a consumer would have credit to a predetermined amount, e.g., 100.00 dollars, usable at any of a number of establishments individually or collectively. Various previously proposed systems of the prior art utilizing a central computer could possibly accomplish such an arrangement; however, the cost of installing and operating such a system would be prohibitive.

If the system determines that the customer has not exceeded his limit with the inclusion of the amount shown in the window 16, the transaction is authorized providing the card is not carried on a list of invalidated cards contained in the unit. Approval is indicated by illumination of a green lamp 18. A red lamp 20 indicates rejection and a yellow lamp 22 indicates caution or standby.

The unit 12 houses a magnetic-tape cartridge receptacle as disclosed in detail below. Access to that receptacle is provided through a door 23. Another door 24 provides access for setting an interval register to indicate the instant month, as disclosed in detail below. Finally, a reset button 26 on the unit is used to clear the unit after a card has been tested and provide a residual "yellow" display by lamp 22.

Figure 2:
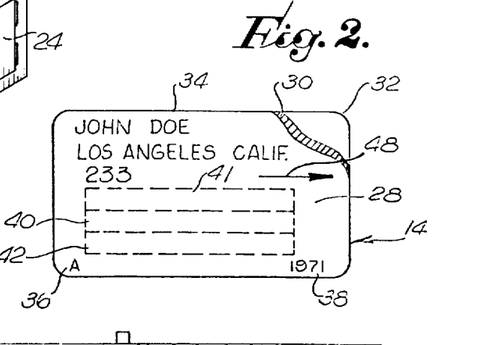
FIG. 2 is a plan view of an identification card suitable for use in cooperation with the unit of FIG. 1.

The identification device or card may take a wide variety of different forms and the card 14 (FIG. 2) is merely illustrative. The card 14 comprises laminated embossed plastic material having a strip 28 of magnetic recording medium, e.f., fine iron oxide particles, sandwiched between plastic laminations. Specifically, as shown in FIG. 2, an upper lamination 30 is bounded to a lower lamination 32 with the strip 28 therebetween. The upper section 34 of the card receives embossed letters identifying the owner by name, address, and account number.

The information recorded in the strip 28 is not humanly perceivable and if desired the strip can be concealed by making the laminations 30 and 32 opaque. However, the strip 28 is shown in phantom in FIG. 2, to include three serial channels 40, 41 and 42 for recording binary digits. The channel 42 may be termed a clock channel and has regularly spaced permanently recorded magnetic variations for timing and identifying the designations recorded in the channels 40 and 41. The designations recorded in the channel 42 may be sensed by a magnetic transducer to provide impulses, spaced apart to establish time bit positions.

The actual code information signals are provided by sequentially sensing of the channels 40 and 41. Essentially, the channel 40 records binary digits (card use information) while the channel 41 records decimal digits (card number). It is noteworthy, however, that the art of data recording is quite advanced with the result that many techniques have been developed. The use of a clock channel and data channels is one technique; however, several alternative arrangements are widely known and used, including techniques employing a single channel as with phase-significant signals.

More specifically, the track or channel 40 records binary signals representative of: (1) the interval (month) when the card was last used to support a transaction, and (2) the aggregate amount of transactions supported by the card during the interval. The track or channel 41 records binary signals representative of decimal digits comprising the card number, which may also be embossed on the card.

The operation and structure for sensing the data and clock channels 40, 41 and 42 and utilizing such information will be considered in detail below. However, preliminarily it is to be noted that the card 14 is to be inserted in the unit 12 (FIG. 3) as indicated by an arrow 48 so that the channels will be sensed from right to left in accordance with the convention adopted herein. As a result, the areas in the channels indicate binary digits from right to left, of increasing significance. The discrete areas of the channel 42 identify the discrete areas indicative of binary digits. In this regard, an initial "zero" or "ready" clock pulse is also carried in the channel 42 for timing purposes.

As indicated above, channel 41 indicates the card number, and the channel 40 indicates a month and a value (dollar amount) as set forth in the following chart:

CHART No. 1

| MONTH | TIME SIGNAL CODE | | | |
|---|---|---|---|---|
| | R4 | R3 | R2 | R1 |
| JANUARY | 0 | 0 | 0 | 1 |
| FEBRUARY | 0 | 0 | 1 | 0 |
| MARCH | 0 | 0 | 1 | 1 |
| APRIL | 0 | 1 | 0 | 0 |
| MAY | 0 | 1 | 0 | 1 |
| JUNE | 0 | 1 | 1 | 0 |
| JULY | 0 | 1 | 1 | 1 |
| AUGUST | 1 | 0 | 0 | 0 |
| SEPTEMBER | 1 | 0 | 0 | 1 |
| OCTOBER | 1 | 0 | 1 | 0 |
| NOVEMBER | 1 | 0 | 1 | 1 |
| DECEMBER | 1 | 1 | 0 | 0 |

| Cumulative Purchase Value | Code | | | | |
|---|---|---|---|---|---|
| | R9 | R8 | R7 | R6 | R5 |
| $10.00 | 0 | 0 | 0 | 0 | 1 |
| 20.00 | 0 | 0 | 0 | 1 | 0 |
| 30.00 | 0 | 0 | 0 | 1 | 1 |
| 40.00 | 0 | 0 | 1 | 0 | 0 |
| 50.00 | 0 | 0 | 1 | 0 | 1 |
| 60.00 | 0 | 0 | 1 | 1 | 0 |
| 70.00 | 0 | 0 | 1 | 1 | 1 |
| 80.00 | 0 | 1 | 0 | 0 | 0 |
| 90.00 | 0 | 1 | 0 | 0 | 1 |
| 100.00 | 0 | 1 | 0 | 1 | 0 |
| 110.00 | 0 | 1 | 0 | 1 | 1 |
| 120.00 | 0 | 1 | 1 | 0 | 0 |
| 130.00 | 0 | 1 | 1 | 0 | 1 |
| 140.00 | 0 | 1 | 1 | 1 | 0 |
| 150.00 | 0 | 1 | 1 | 1 | 1 |
| 160.00 | 1 | 0 | 0 | 0 | 0 |
| 170.00 | 1 | 0 | 0 | 0 | 1 |
| 180.00 | 1 | 0 | 0 | 1 | 0 |
| 190.00 | 1 | 0 | 0 | 1 | 1 |
| 200.00 | 1 | 0 | 1 | 0 | 0 |
| 210.00 | 1 | 0 | 1 | 0 | 1 |
| 220.00 | 1 | 0 | 1 | 1 | 0 |
| 230.00 | 1 | 0 | 1 | 1 | 1 |
| 240.00 | 1 | 1 | 0 | 0 | 0 |
| 250.00 | 1 | 1 | 0 | 0 | 1 |
| 260.00 | 1 | 1 | 0 | 1 | 0 |
| 270.00 | 1 | 1 | 0 | 1 | 1 |
| 280.00 | 1 | 1 | 1 | 0 | 0 |
| 290.00 | 1 | 1 | 1 | 0 | 1 |
| 300.00 | 1 | 1 | 1 | 1 | 0 |
| 310.00 | 1 | 1 | 1 | 1 | 1 |

The above code signals bear a designation R, indicating signals sensed from the card. However, similar code signals are designated D and are provided from elements of the unit 12 as described below.

Figure 3:
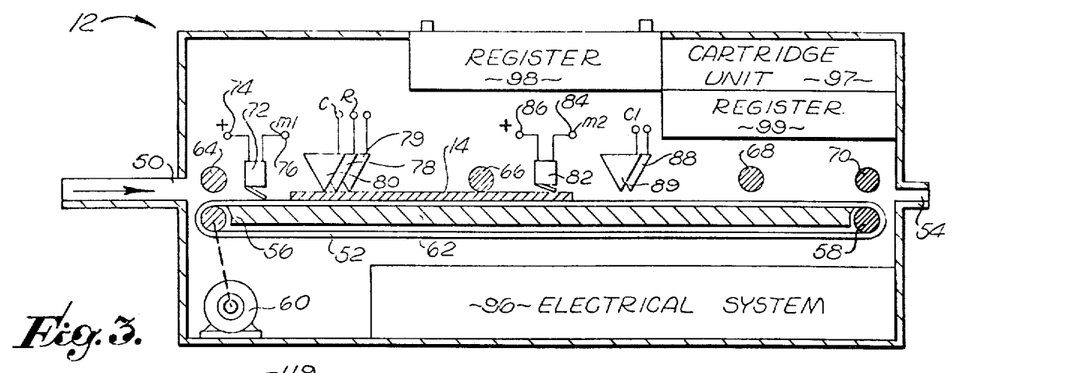
FIG. 3 is a diagrammatic and vertical sectional view taken through the structure of FIG. 1.

The structure for sensing code signals from the magnetic strip 28 is shown in FIG. 3, indicating a partly diagrammatic sectional view through the unit 12. The card 14 is placed into the unit 12 through an entry port 50 to be received on a rotary belt 52 for movement through the unit to an exit port 54. The belt 52 may comprise any of a variety of endless flexible forms and is held extended between a drive roller 56 and an idler roller 58 fixed at opposite ends of the unit. The drive roller 56 is mechanically coupled to be revolved by a motor 60 which moves the belt 52 at a substantially constant speed, e.g., 5 inches per second across a support table 62.

As a card is carried across the table 62 it is held down by a series of rollers. Specifically, a first roller 64 is rotably mounted above the roller 56 to engage the card 14 upon entry and hold the card in firm engagement with the belt 52. Spaced apart along the belt 52, rollers 66, 68, and 70 perform a function similar to that of the roller 64.

Upon passing between the rollers 56 and 64, the card 14 engages a microswitch 72 which is connected between a source of potential (applied to a terminal 74) and an output terminal 76. The signal appearing at the terminal 76 is termed M1 herein and is used as a timing signal. In this regard, a number of timing and operation signals are developed and utilized in the exemplary structure which will be introduced and explained below; however, for convenience these signals are set forth here as:

SIGNAL IDENTIFICATION

TIME CODE SIGNALS

| D1 | First Bit, month |
| D2 | Second Bit, month |
| D3 | Third Bit, month |
| D4 | Fourth Bit, month |
| D5 | First Bit, value |
| D6 | Second Bit, value |
| D7 | Third Bit, value |
| D8 | Fourth Bit, value |

SIGNAL IDENTIFICATION-Continued

TIME CODE SIGNALS

| | |
|---|---|
| D9 | Fifth Bit, value |
| D | Generic designation for signals D1–D9 — unit-registered |
| R1–R9 | Card-registered signals (Code — See above chart) |
| R | Generic designation for card-registered signals R1–R9 |
| RN1–RN9 | Card number binary digital signals. (From card) |
| DN1–DN9 | Card number binary digital signals. (From revoked card list) |

BINARY OPERATION SIGNALS

| | |
|---|---|
| M1 | Microswitch signal (first card position) |
| M2 | Microswitch signal (second card position) |
| M3 | Operation complete signal |
| C | Clock signal (read section — phase 1) |
| C1 | Clock signal (record section — phase 2) |
| S0–S9 | Card position signals (clocked binary and decimal digits) |
| P1 | Phase one-operation signal |
| P2 | Phase two-operation signal |
| P3 | Phase three-operation signal |
| GR | Green light signal — approval |
| RD | Red light signal — disapproval |
| Y | Yellow light signal — improper code, or the like |
| ' | Indicates binary negation of a signal |
| RS | Reset signal (manual) |
| L | Preliminary disapproval signal |
| NG | "no go" signal indicates unauthorized situation |
| V | Valid timing for card use |
| I | Difference exists between time on card and in register |
| RL | Regular Limits (per card number coding) |
| RL' | Double regular limits |

Returning to a consideration of the motion of the card 14 through the unit 12 (FIG. 3) after the leading edge of the card activates the microswitch 72, the card moves under side-by-side magnetic reading heads 78, 79 and 80 which sense the channels 40, 41 and 42 of the card. The heads 78, 79 and 80 are shown diagrammatically and are understood to be aligned in spaced-apart relationship. The read head 80, sensing the clock channel 42 provides a uniform series of pulses which are termed clock pulses C. The head 78 sensing the channel 40 provides binary code pulses R representative of binary digits (from least-significant to most-significant) as characterized by the code set forth in chart above and identified as digits R1 through R9. Similarly the head 79 senses the card-number signals RN1-RN9 from the channel 41.

Continued movement of the card 14 through the unit 12 brings the leading edge of the card into contact with a microswitch 82 to actuate the microswitch forming a signal M2 high at a terminal 84 by closing the switch to a source of potential indicated to be applied at the terminal 86. Next, the card 14 moves under a magnetic recording head 88 and reading head 89 which cooperate with the electrical system to update the signals recorded in channel 40.

The unit 12 also houses an electrical system 96, a magnetic cartridge or cassette tape unit 97 and electromechanical registers 98 and 99. The contemplated amount of purchase or transaction value to be supported by the credit card is set on the electromechanical register 98 manually, to be indicated in the window 16 (FIG. 1). The current month, or other period is set on the register 99. The details of these units are set forth below.

Figure 4:
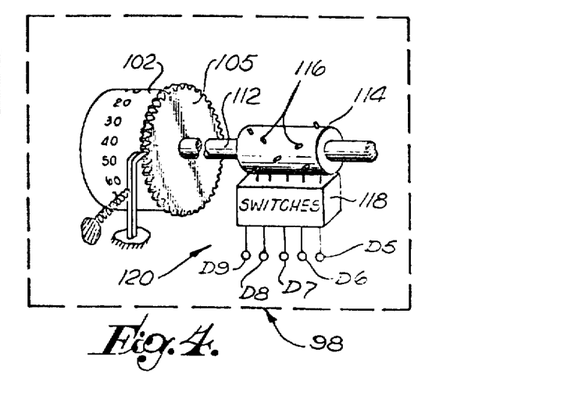
FIG. 4 is a schematic and perspective view of a component part of the system of FIG. 1.

The register 98 as depicted in FIG. 4 may be manually set to display an amount and also control switches to provide electrical binary signals D5-D9 indicative of that amount. Considering the structure, values as indicated in the above chart are visually displayed about the periphery of a drum 102. The drum 102 is mounted for independent rotation and incorporates an indexing ratchet 105 so as to be settable to indicate various values.

The drum 102 is carried on a shaft 112 which rotably supports a signal drum 114 having switch-closing radially-extending pins 116. The pins 116 variously engage the switches 118, depending on the angular offset of the drum 114, to provide binary signals D5-D9 at terminals 120 which manifest the indicated amounts in accordance with the code set forth above. Specifically, for example, when the drum 102 is set to indicate 70.00 dollars, the terminals 120 provide a binary code 00111. Thus, the terminals 120 provide binary parallel signals D5-D9, indicative of the amount registered.

Figure 5:
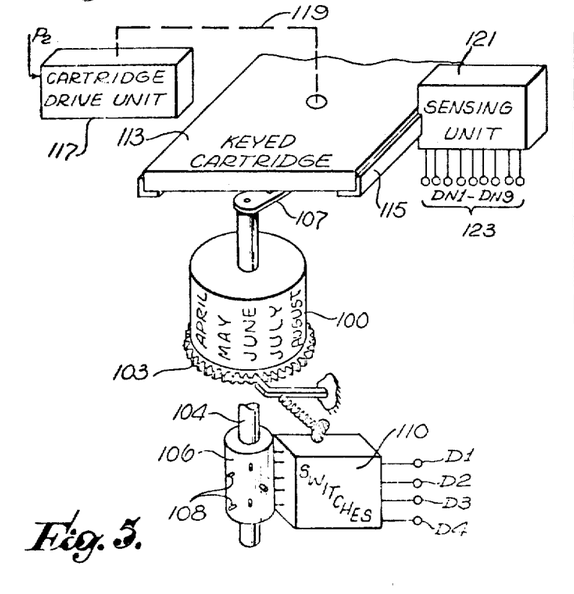
FIG. 5 is a schematic and perspective view of another component part of the system of FIG. 1.

Considering the details of the month register 99 (FIG. 3) reference will now be made to FIG. 5, showing that structure along with the magnetic-tape structure. The register includes a drum 100 that may be manually set to a particular month whereby a proper month cartridge 113 will be accepted and appropriate month-indicating signals will be provided as set out in the above chart. Specifically, the drum 100 is vertically supported on a rotary shaft 104 which terminates in a rotary index key 107, and which also carries a signal drum 106 from which actuating pins 108 extend radially to control switches 110 in accordance with the angular position of the drum 106. When the drum 100 is positioned to indicate a particular month, the attached drum 106 is positioned to close certain of the switches 110 and provide binary digits D1-D4 at terminals 111 which are indicative of the selected month. For example, when the unit is set at "May" the code signals 0101 are provided at the terminals 111.

The setting of the drum 100 to indicate a particular month also sets the index key 107 in one of twelve positions in a circular pattern to be matingly received in an indentation (not shown) in a proper-month cartridge 113. Accordingly, the cartridge 113 is recorded for a specific month and similarly indexed by a small indentation on the underside thereof to receive the key 107. Consequently, coincidence of the desired month for operation and the month to which the cartridge 113 relates, is controlled by the keyed relationship which limits the entry of cartridges in the holder 115.

The cartridge 113 may take a variety of forms of devices for storing signal-represented data for information. In the embodiment as described, a magnetic tape structure is disclosed carrying a closed loop of tape as well known in the prior art and as disclosed in U.S. Pat. Nos. 2,876,005 and 2,658,955. The tape is moved by a drive unit 117 which is mechanically coupled, as well known in the art, to the cartridge 113, as indicated by a dashed line 119. The tape cartridge 113, is sensed by a sensing unit 121 to provide recurring sets of nine decimal digit code words at terminals 123. In general, and as described in detail below, these signal-represented code words represent the card numbers (DN1-DN9) which have become unacceptable. Additionally, specific digits may designate the credit control limits to be imposed at the location of the system, which may be varied from month to month.

For example, the first digit of a card number (DN1 and DN2) may be coded to indicate the card holder's credit limits, which in trun may be varied by data carried on the cartridge 113 in the same digit location. For example, the least significant digits of the card number may have the following significance.

| N1–N2 | Regular Limits |
|---|---|
| 0 | Card owner entitled to $20.00 credit per month |
| 1 | Card owner entitled to $40.00 credit per month |
| 2 | Card owner entitled to $80.00 credit per month |
| 3 | Card owner entitled to $160.00 credit per month |

If the limits are to be liberalized, at a specific location, then the cartridge 113 may be coded, for example, to double the regular limits after an initial test cycle. It is noteworthy that in an actual system this flexibility may be expanded. For example, the time consideration may be altered. Also, it is to be recognized that as disclosed herein, the total number of cards accommodated is merely exemplary. Recognizing this consideration, the format for the binary-decimal signals carried in the cartridge 113 may be as follows.

| Decimal Code | | | | | | | | | Indication |
|---|---|---|---|---|---|---|---|---|---|
| (Prefix "D" indicates from cartridge 113, and prefix "R" indicates from card 14) | | | | | | | | | |
| N9 | N8 | N7 | N6 | N5 | N4 | N3 | N2 | N1 | |
| 0 | 0 | 0 | 0 | 0 | 0 | 0 | 0 | 0 | END CODE |
| 1 | 1 | 1 | 1 | 1 | 1 | 1 | 1 | 0 or 1 | START TAPE LOOP (N1 = 0 regular limits N1 = 1 double limits) (Card numbers — arbitrary) |
| 0 | 0 | 0 | 0 | 0 | 0 | 0 | 1 | 0, 1, 2, or 3 | 10, 11, 12, or 13 |
| 0 | 0 | 0 | 0 | 0 | 0 | 0 | 2 | 0 | . |
| 0 | 0 | 0 | 0 | 0 | 0 | 0 | 3 | 0 | . |
| 0 | 0 | 0 | 0 | 0 | 0 | 0 | 4 | 0 | . |

Note that in the exemplary format, the least-significant digit (N1 N2) indicates credit limits; however, the remaining digits are simply arbituarily assigned. Thus, the owner of a card bearing the least-significant digit 0 would normally be entitled to total credit purchases up too an aggregate amount of 20.00 dollars per month at any of a plurality of stores or stations unless "double" credit limits were active. Similarly, as set out, increased amounts would be permitted the owners of cards having designations 1, 2 and 3.

Considering the operation of the system initially very generally, as indicated the card 14 (FIG. 2) carries: an identification number; the month when last used; and the aggregate value of transactions supported during that month; all in signal-represented form. The cartridge 113 (FIG. 5) records credit limits to be imposed (regular or double) and unacceptable card identification numbers. The switches 110 (FIG. 5) indicate the instant month and the switches 118 (FIG. 4) indicate a representation of value for the contemplated transaction.

Upon insertion of the card 14 (FIG. 1) the system senses the card to determine: the month when the card was last used and the amount of credit purchases consummated during that month. If the card registers no credit purchases during the current month, and the contemplated transaction is within the imposed limit, tentative approval is manifest. However, if credit purchases have been made in the instant month, they are totalled with the amount of the proposed purchase, and tentative approval is indicated only if the limit is not exceeded. Tentative approvals are confirmed as final after scanning the unacceptable identification numbers carried by the cartridge 113.

Considering the system in greater detail, on each use, the drum 102 (FIG. 1) is set to indicate the amount of the contemplated purchase. The month drum 100 (internal) is coded to provide D1-D4 while the amount drum 102 provides signals D5-D9.

It is to be noted, that the code format D5-D9 (or R5-R9) as set forth above in chart form, is applicable to amounts of individual purchases as well as the aggregate or total purchases as recorded by binary signals on the card 14.

After setting the amount of contemplated purchase, the operator inserts the credit card 14 into the unit 12 which senses the signals R1-R4 (indicative of the month when the card was last used) for comparison with the signals D1-D4 in a similar code (representative of the current month as indicated by the drum 100 inside the unit). If the card has not been used during the current month, if the proposed purchase is within the limit, and if the card is acceptable, a green light 18 is illuminated to indicate approval. However, if the machine senses that the card has been used during the current month, it adds the amount indicated on the drum 102 (representing the current transaction by signals D5-D9) to the accumulated amount of purchases previously made during the month as recorded on the card (represented by signals R5-R9). If the amount exceeds the permissive limit the red light 20 is illuminated indicating that the purchase would exceed the limit. Of course, the red light 20 is also illuminated if the card number is carried in the cartridge 113 as unacceptable. Otherwise, the green light 18 is energized. As still another possibility, if the machine detects a malfunction or a misrecording, a yellow light 22 is illuminated. In this manner the sales person, or other person controlling the transaction is immediately informed of the status of the card bearer. It is readily apparent that the system may be conveniently employed in multiplicity at widely remote locations to effectively manifest a current status.

As disclosed herein, the structure is not extended to accommodate the "year" component of the date. However, such structure merely represents an extension of the system as disclosed and has been eliminated in the interest of simplification in the teaching. Generally, the inclusion of structure to record the "year" in dates serves to combat manipulation of the registers by a dishonest employee as to accommodate an accomplice. With the "year" incorporated in the system, if a future date was set on a machine by a dishonest clerk to authorize a purchase exceeding the current limit on the card, the card would be marked against further use on machines set with the current date until the future date recorded on the card is reached. As an example, an accomplice clerk might adjust the "year" in processing a long un-used card to approve a large cumulative value. Various ratchet structures and the like might therefore be incorporated to prevent manipulation of the registers as to accommodate dishonest use of a card.

Considering the operation in somewhat greater detail, as indicated above, the drum switches 110 and 118 (FIGS. 4 and 5) provide nine binary digits, e.g., digits D1-D4 (current month) and digits D5-D9 (the dollar amount). These digital signals D1-D9 are applied to a series of "and" gates A1 through A9 (FIG. 6a) respectively. The gates A1 through A9 also receive input signals S1 through S9 which are provided from a timing system or circuit 124. The timing system 124 receives the timing signals M1, M2 and M3 and clock signals C and C1 to provide the signals S and the distinct phase signals P1, P2 and P3 which indicate sequential time phases of operation of the unit. The negation signals are also developed in the timing system. As well known in the prior art, the negation of a signal may be formed by a conventional inverter which reverses the state of a received two-state signal as widely used in the binary logic systems. In accordance with the convention hereof the negation of a signal is represented by the signal designation followed by a symbol ' thereafter.

Figure 6A:
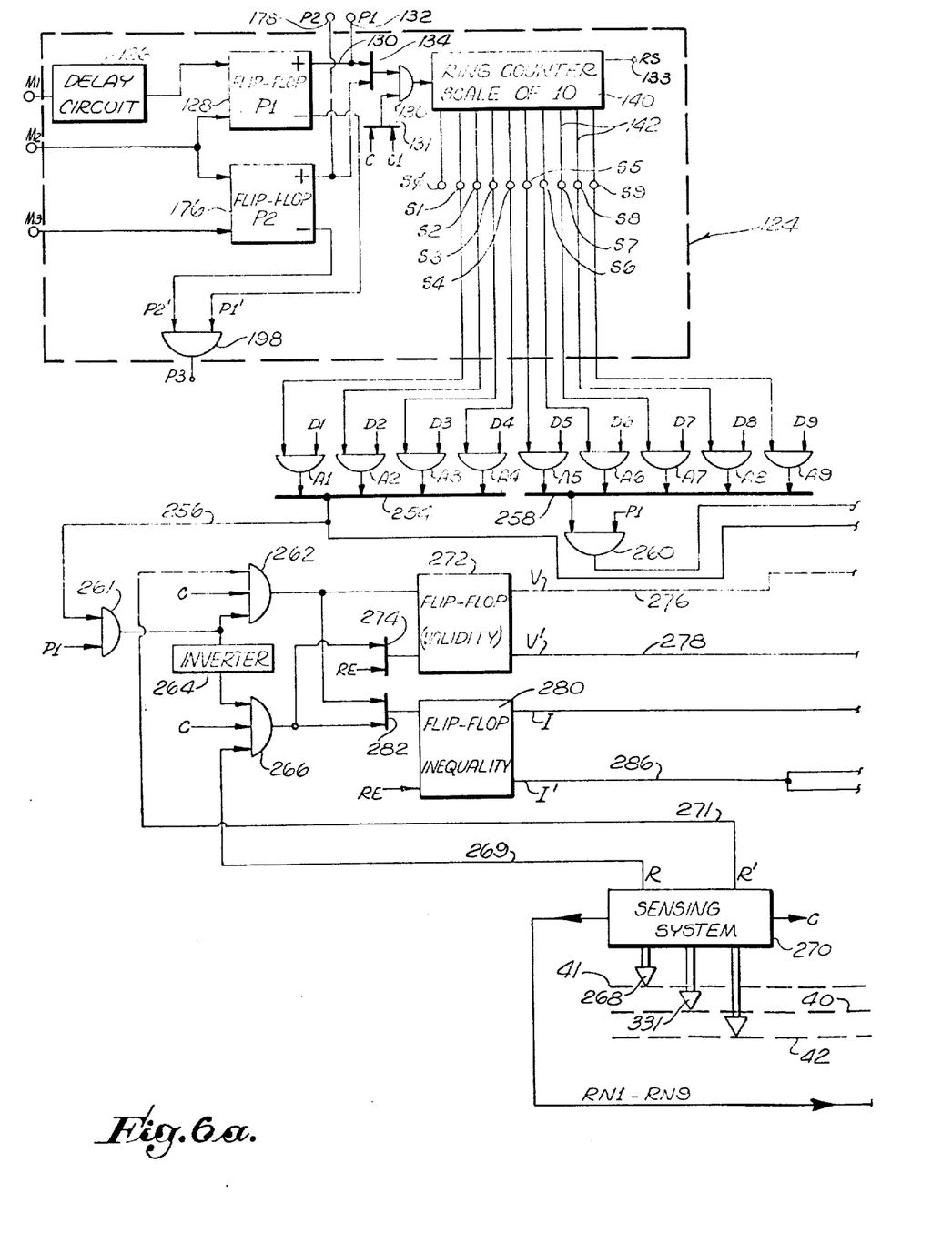
FIGS. 6a and 6b jointly are a diagrammatic representation of the electrical system of the structure of FIG. 1.

In addition to developing the phase signals, the timing system 124 also provides sequence signals S1 through S9 which are time-indicative of the digit positions metered by the clock channel 42 on the card. That is, the signals S1 through S9 specify access time to the digit positions of the card channel 40, from least-significant to most-significant.

The specific structure of the timing system 124 includes a delay circuit 126 which receives the signal M1 and after a brief interval sets a flip-flop 128 indicating the card is in a position to be sensed. The flip-flop circuits employed herein may comprise any of a variety of bi-stable devices having a "set state" in which the positive output to one conductor (e.g., conductor 130) is high and the negative output is low, or a "reset" state in which the reverse is true so that the binary signal in the conductor 130 is low. The set state of the flip-flop 128 manifests the first phase P1, during which the signal P1 is high and during which magnetic signals are sensed from the identification card.

During the first phase of operation, the high signal P1 appears at a terminal 132 and is applied through an "or" gate 134 and an "and" gate 136. The gates 134 and 136 may take any of a wide variety of forms as well known in the prior art to accomplish the logic operations thereof on applied binary signals.

During the first phase, the set-state of the flip-flop 128, providing the signal P1 high, qualifies the "and" gate 136 to pass clock pulses C to a scale-of-ten ring counter 140 (applied through "or" gate 131). The counter 140 may take a variety of different forms as well known and readily available in the prior art, and has ten output conductors 142 one of which exclusively provides a high signal to indicate the current state of the counter. In accordance with the operation of such counters, each pulse applied (as from the gate 136) advances the state of the counter so that the single high-state binary signal progresses to the next conductor 142 in sequence. The counter is reset by application of a reset signal to a terminal 133, as described below.

The first conductor 142 from the counter 140 carries a signal S0 which manifests the reset or quiescent state of the counter 140. The conductors 142 in sequence then carry the signal S1 through S9 which are applied from the timing circuit 124 to the series of "and" gates A1 through A9. In this manner, these gates are qualified by the series of sequential signals S1 through S9 in synchronism with the sensing of the digit positions in clock channel 42 of the card 14. Specifically, for example, the gate A1 is qualified by signal S1 during the sensing of the first digit position (least significant) in the channel 42. The gates A2 through A9 are thereafter qualified in sequence by the signals S2 through S9 in timed relationship to the card-sensed signals R2 and RN2-RN9.

As indicated above, the gates A1 through A9 also receive input signals D1 through D9 respectively which are the signals sensed from the switches 110 and 118 (FIGS. 4 and 5). The "and" gates A1 through A9 are qualified by the timing signals S1 through S9 in sequence to provide internally-registered (date) signals D1 through D4 through an "or" gate 254 to a conductor 256, and signals D5-D9 (value) through an "or" gate 258 to an "and" gate 260 which also receives the first phase signal P1.

In the comparison of time signals (D to R) the conductor 256 carries the month signals D1 through D4 to an "and" gate 261 which is qualified during the first phase of operation by the signal P1. Thus, during the first phase, the signals D1 through D4 are applied to an "and" gate 262 and through an inverter 264 to an "and" gate 266. The "and" gate 262 also receives the signals R' (R1'-R4') through conductor 269 which are sensed from the channel 40 of the card and which indicate the binary month recorded thereon as described below in detail.

Specifically, the channel 40 is sensed by a head 331 to formulate the signals R and R' in the conductors 269 and 271 (in accordance with the adopted convention) by a sensing system 270 as well known in the art. The negation signals R' are applied to the gate 262 along with clock signals C and the true signals D1, D2, D3 and D4 which are thus compared with the negation signals R1',R2', R3', and R4'. As described, the presence of a "one" digit in the negation signals R' indicates a zero; therefore, if the signals D1-D4 represent a month which is later (higher value) than the month represented by the signals R1-R4, the gate 262 is qualified and passes a signal to set a flip-flop 272. The flip-flop 272 is reset if the reverse situation is detected by the gate 266. That is, as the gate 266 receives the negation of the signals D and the true signals R it becomes qualified by the occurrence of higher values for R indicating later months. As previously described, the most-significant digits are treated last; therefore, the final state of the flip-flop 272 indicates which of the values is higher and therefore which of the values represents a later month.

The output from the gate 266 is applied to the flip-flop 272 through an "or" gate 274 which also receives the manually timed reset signal RE. As a result, the flip-flop 272 is reset at the initiation of operation and continues to be reset at the conclusion of the first phase unless the card registers a month (R1-R4) earlier in time than the internal register (D1-D4). In such a situation, wherein the flip-flop 272 is set, a validity signal V is established high in a conductor 276 while the negation signal V' appears in a conductor 278.

In the event of favorable dissimilarity between the signals R1, R2, R3 and R4 and the signals D1, D2, D3 and D4 (card month earlier) it is necessary to update the record on the card. The occurrence of such dissimilarity is registered in a flip-flop 280. The flip-flop 280 is set through an "on" gate 282 which receives the output from the gate 262 as well as the output from the gate 266. Therefore, the initially reset flip-flop 280 is set upon detection of any dissimilarity between the signals of concern, regardless of which signals indicate a higher value or a later month.

At the conclusion of the signal S4, the flip-flops 272 and 280 are independently either set or reset. Summarizing, the flip-flop 280 is reset if the reference month signals D (unit registered) and the subject month signals R (card recorded) are the same. The flip-flop 272 is set if these signals indicate the card has not been used during the current month. If the card has been used last, prior to the current month (flip-flop 272 set) it is merely necessary to assure that the current purchase does not reach the applied limit for tentative approval. As described in detail below, this is done by setting a flip-flop 313 (center FIG. 6b) with a time selected one of the signals S5-S9, to indicate the limit of the amount of the intended transaction. Any excess is then presented by the signals D5-D9 through an "or" gate 287 to qualify an "and" gate 315.

Figure 6B:
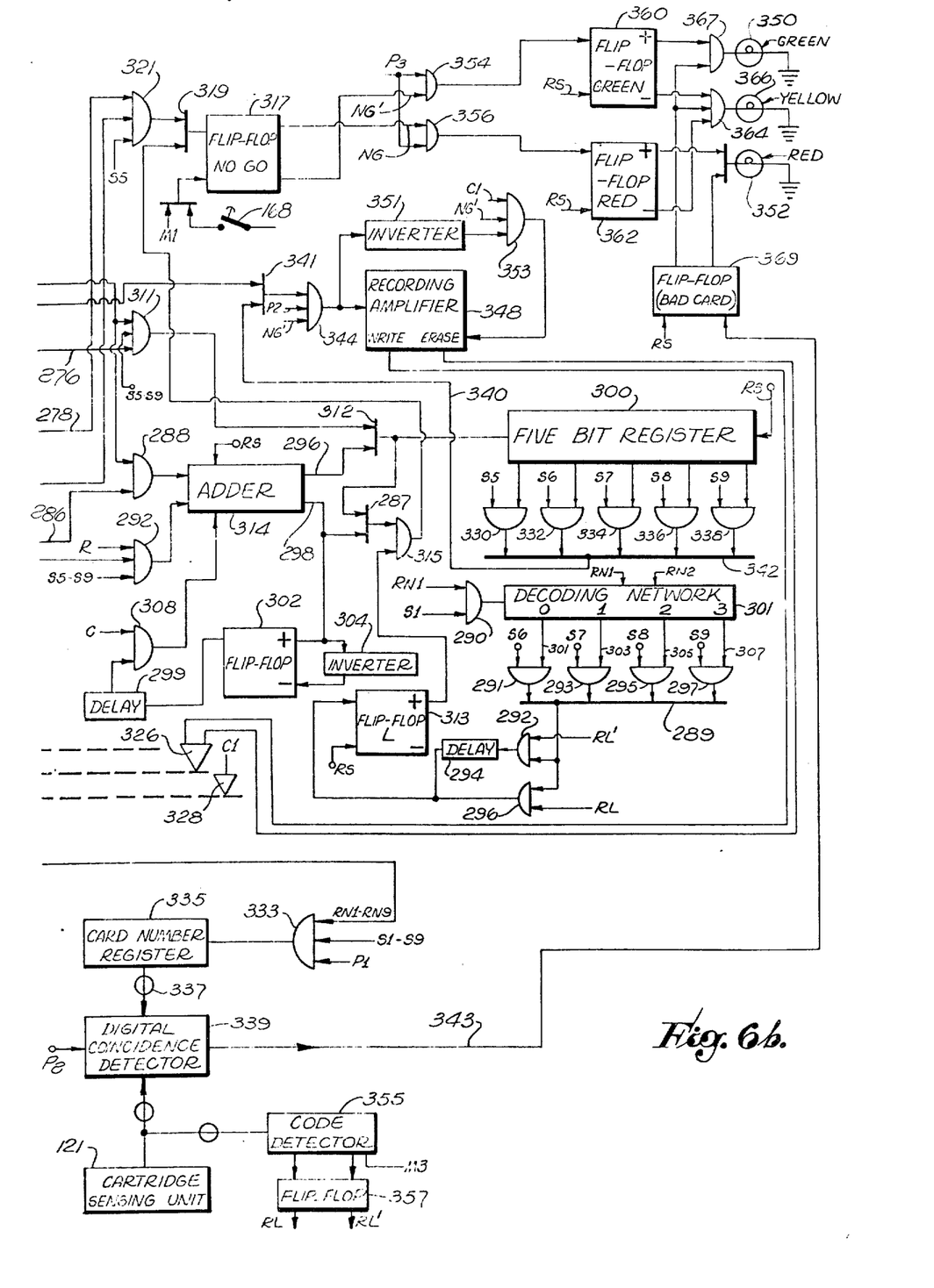

The flip-flop 313 receives time-critical signals from "and" gates 291, 293, 295 and 297 through either a gate 292 and a one-bit delay circuit 294 or directly through an "and" gate 296. One of the "and" gates 292 or 296 is qualified, depending on the state of a flip-flop as described below for providing signals RL and RL'. If RL is high, regular limits are in force; however, if RL' is high, the regular limits are doubled. This structure may be variously used. For example, certain locations may desire increased limits or standards. However, in any event, the system affords greater flexibility stemming from the incorporation of structure for current information afforded by the magnetic tape cartridge 113, as illustratively described herein. The detailed structure for providing the signals RL and RL' from the cartridge 113 is described below.

The signals provided to the flip-flop 313 (under control of signals RL and RL') are time sequenced with reference to the values 20, 40, 80, and 160 dollars, which are identified by the timing signals S6, S7, S8 and S9. That is, as apparent from the above chart, these signals in time sequence are associated with the specified dollar values. The gates 291, 293, 295 and 297 are therefore connected to receive credit limit signals from a decoding network 301 which is controlled by the least significant digits of the card number to indicate the customer's credit limit. Specifically, the regular limits in the assumed example are as indicated above from 20 to 160 dollars, depending upon the digit signal RN1 and RN2 of the card number. The digit is received through an "and" gate 290 during the interval of signal S1 for decoding by a network 298, as well known in the art, to provide one of four outputs 301, 303, 305 or 307 high to thereby selectively qualify one of the "and" gates 291, 293, 295 or 297.

The application of a high binary signal from the "or" gate 289, to the flip-flop 313 sets that flip-flop when the card-holder's limit has been reached. Thereafter, the occurrence of any further signals to indicate the dollar limit has been exceeded will qualify the "and" gate 315 to set a flip-flop 317 through an "or" gate 319. The set state of the flip-flop 317 provides the signal NG high to indicate the transaction is not acceptable, as will be described below in detail.

In addition to performing the comparison described above, the system must record the amount of the contemplated transaction for future reference. Therefore, the signals D5, D6, D7, D8 and D9 pass through gate 311 and through the gate 312 to a storage register 300. The removal of these signals (or total signals) from the register 300 for recording the card channel 40 is described below.

If the card has been used during the current month, the system must add the dollar volume of transactions for which the card has been used during the current month to the value of the proposed transaction, in order to ascertain whether or not the proposed transaction will exceed the allowed aggregate limit. This situation is manifest by a reset state for the flip-flop 280 (lower center FIG. 6a) forming the signal I' high. The negation signal I' (in conductor 286 indicating month coincidence) commands that the transactions be totalled and is applied to an "and" gate 288 (FIG. 6b) which also receives the signals D5, D6, D7, D8 and D9 in sequence, from the "and" gate 260 representing the amount of the proposed present purchase. The output of the gate 288 is applied to an adder 314. The other input to the adder 314, signal R (R5, R6, R7, R8 and R9) is applied through a gate 292 (clocked by signals S5-S9). The gates 288 and 292 thus comprise the inputs to the binary adder 314 as well known in the prior art for producing "sum" signals in a conductor 296 and a "carry" signal in a conductor 298 and which is cleared by the reset signal RS.

The signals D5-D9 and R5-R9 are additively combined in the adder 314 and the sum signals are registered in the five-stage register 300 for temporary storage pending the time when the signals will be recorded on the card during the second phase of operation. It is to be noted, that carry digits are propagated in the operation of the adder 314 as generally well known in the prior art by means of a flip-flop 302. An inverter 304, and a delay circuit 299 which is returned to the input through a clock-qualified "and" gate 308 are well known in the prior art.

During the period of phase one (P1) when the sum digits are being placed in the register 300, these signals are also being tested against the authorized limit. Specifically, the "sum" output from the adder 314 is passed through conductor 296 and gate 312 to be tested against the limit signals by the "and" gate 315 as previously described. If the limit is reached, the "no-go" flip-flop 317 is set.

The flip-flop 317 will also be set when the recorded card date is later than the current date, as would result from tampering. This situation is manifest by the flip-flop 272 being reset, and the flip-flop 280 being set.

Thereupon, an "and" gate 321 is qualified and at the time of signal S5 the gate 321 passes a signal to set the "no-go" flip-flop 317.

Summarizing, as the conclusion of the first phase of operation, the flip-flop 317 is either reset to indicate a tentatively approved transaction or set to register disapproval, i.e., "no-go." Additionally, the total purchases for the present month (including the contemplated purchases) are registered as an aggregate sum in the register 300 to be recorded in channel 40 of the card during the second phase of operation.

In the second phase of the operation, initiated by the signal M2 and defined the signal P2, the channel 40 on the card is available to a recording head 326 for synchronized recording under control of pulses C1 from the parallel clock channel 42 sensed by a head 328. Also during that interval, the unacceptable card numbers borne in the cartridge 113 are compared with the number of the instant card.

Initially considering the recording operation, if clearance is given, an "or" gate 341 (FIG. 6b, upper central) first passes the signals D1-D4 (representing the present month) which in turn pass through a gate 344 to a recording system 348 from which they are recorded in the channel 40. It is to be noted that "one digits" are recorded by direct application to the amplifier 348, while "zeros" are recorded by passage through an inverter 351 to an "and" gate 353 (qualified by NG' and C1) to drive the amplifier 348 to erase the instant content of the channel.

After the month signals D1 through D4 are recorded, the digits of the register 300 are stepped out under control of the signals S5-S9, to pass through the "and" gates 330, 332, 334, 336 and 338 in sequence, then through the "or" gate 342, the conductor 340, the gate 341 and the gate 344 to drive the recording amplifier to energize the recording head 326. In this manner, the aggregate or total value of purchases during the current month is recorded.

Considering the operation in greater detail, the contents of the register 300 (accumulated value) in five stages is applied to the five "and" gates 330, 332, 334, 336 and 338 which are qualified during the second phase P2 of operation by the signals S5 through S9 respectively. As a result, the binary contents of the register 300 is serialized during the period of the timing pulses S5 through S9 to appear as a series of binary pulses in a conductor 340 which applies the output of each of the above gates through an "or" gate 341. The conductor 340 supplies the series binary signals through an "or" gate 341 to an "and" gate 344 which is qualified by the signal P2 indicating the second phase of operation during which recording takes place. After the recording on the card 14 is complete and it has cleared the recording head 326, the second phase (P2) is terminated when the card number comparison is complete. The operation of the system, during the second phase (P2), to determine whether or not the card number under investigation has been revoked will now be considered. The numbers of revoked cards are registered on magnetic tape contained in the cartridge 113 (FIG. 5) from which indicative sets of signals DN1-DN9 are provided. The number of the card under investigation is sensed, as indicated above, from a channel 41, (FIGS. 6a and 6b) by a head 268 to provide a signal set of signals RN1-RN9 representative of the code number. The signals RN1-RN9 are gated through an "and" gate 333 during the first operating phase (P1) into a register 335.

A cable 337 connects the register 335 to a digital coincidence detector 339 which is similarly connected to the cartridge sensing unit 121 (FIG. 5). The cartridge drive unit 117 is actuated during the interval of the signal P2 with the result that the sets of signals DN1-DN9 (representing revoked numbers) are supplied through a cable to the digital coincidence detector 339 (activated by signal P2) seeking coincidence with the signals RN1-RN9 held by the register 335. Various forms of coincidence detectors are well known in the art.

In the coincidence detector 339 senses an identity, a pulse is produced in a conductor 343 which sets a flip-flop 369. The set state of the flip-flop 369 actuates a red bulb 352 (associated with the lamp 20, FIG. 1) and inhibits "and" gates 367 and 364 so that no other bulb can be energized. Note that the flip-flop 369 is reset by the reset signal RS.

If the detector 339 does not sense a coincidence and reaches the end code word (DN1-DN9) 000000000, the card number is indicated to be clear. Specifically, at the end of the tape, the end code word is detected by a code detector 355 (bottom FIG. 6b) to provide the signal Mz high, thereby initiating the final phase of operation manifest by the signal P3.

The code detector 355 also detects the presence of either the code 111111110 or 111111111 as start codes to indicate the use of regular value limits or alternatively, double value limits. The former code sets a flip-flop 357 to provide the signal RL high, while the latter code group sets the flip-flop 357 to provide the signal RL' high. The use of these codes to control the imposed credit limits was considered in detail above.

During the third phase of operation, (signal P3) the various signals are applied to indicate whether or not the proposed transaction is authorized. If the signal NG' from the flip-flop 317 is high, indicating that the card is clear, the green light 350 is to be illuminated and if the signal NG is high the red light 352 is energized. The signals NG' and NG are applied to "and" gates 354 and 356 respectively, which gates are qualified as the third phase starts. Therefore, either: the gate 354 is qualified to set a flip-flop 360 or the gate 356 is qualified to set a flip-flop 362. These flip-flops 360 and 362 provide the signals GR and RD respectively to selectively illuminate one of the lights 350 or 352. If, however, neither of the flip-flops 360 nor 362 is set, the signals GR' and RD' therefrom qualify "and" gate 364 to illuminate the yellow light during the third phase of operation. Thus, the system is effective to provide a direct indication of status as a basis for action.

It is readily apparent that the present invention may be variously embodied for purposes of control in the use of identification cards as broadly defined, as well as to effectively, control action by card bearers. As suggested above, the various applications for different embodiments of this system are large in number and it is readily apparent that the criterion for the signals registered in the system may vary widely over different periods of time and for different measures of time. Accordingly, the scope hereof is understood to be defined by the claims as set forth below.

What is claimed is:

1. A method of processing credit cards or the like which bear a recording medium and are employed to support an aggregate total value of credit transactions during each of a series of time intervals comprising the steps of:

sensing value-related signals from said recording medium representative of use of said card during one of said intervals;

sensing time-related signals from said recording medium representative of a time of last use of said card to support a credit transaction;

processing said value-related signals and said time-related signals in combination to provide approval signals upon a determination that the use of said card during a current one of said intervals is within said aggregate total value;

recording new value-related signals and time-related signals on said recording medium in accordance with the use of said card indicated during a current time interval.

2. A method according to claim 1 wherein said step of recording new signals includes alternately recording fresh value-representative signals reflecting said value-related signals sensed from said recording medium or new value-representative signals of predetermined magnitude depending upon the relationship of said time of last use of said card and said current one of said time intervals.

3. A method according to claim 1 wherein said step of processing includes combining said value-related signals with signals representative of a contemplated credit transaction.

4. A system for controlling the use of a credit card, or the like, which carries a recording medium, to authorize transactions to a predetermined permissive limit during a specified period, comprising:

means for providing signals indicative of a current time period;

means for providing signals indicative of a current transaction value;

means for sensing signals from said recording medium indicative of a prior recorded value and a prior recorded time period;

one means for comparing said signals indicative of a current time period with said signals indicative of a recorded time period to provide a first approval signal if said comparison indicates a favorable dissimilarity, and to otherwise provide a command signal if said comparison does not indicate a favorable dissimilarity;

another means, operatively effective under control of said command signal for comparing said signals indicative of recorded value and current transaction value in relation to said predetermined permissive limit to provide a second approval signal in the event of a favorable dissimilarity;

first means, operatively effective under control of said means for comparing, for recording signals indicative of a current recorded value on said recording medium reflecting a combination of said current transaction value and said prior recorded value;

second means, operatively effective under alternative control of said means for comparing, for recording alternative signals indicative of a current recorded value on said recording medium reflecting a combination of said permissive limit and said current transaction value;

third means, operatively effective under control of first approval signals from said means for comparing, for recording said current time period on said recording medium as said recorded time period; and means for manifesting approval of a transaction upon occurrence of one of said approval signals.

5. A system according to claim 4 wherein said first and second means operate under control of said means for comparing to record signals representative of the arithmetic combination of said predetermined limit and said current transaction value, upon the occurrence of said first approval signal; and upon the occurrence of said second approval signal, to record signals representative of an arithmetic combination of said current transaction value and said prior recorded value.

6. A system according to claim 4 wherein said one means for comparing includes: means for providing limit signals indicating said predetermined permissive limit; and means for arithmetically testing said limit signals against said signals indicative of a current transaction value and said prior recorded value signals.

7. A system according to claim 4 wherein said one means for comparing includes: means for providing limit signals indicating said predetermined permissive limit; means for arithmetically combining said signals indicative of a current transaction value and said signals indicative of said prior recorded value to provide current accumulated value signals; and means for arithmetically testing said signals indicating said predetermined value against and said current accumulated value signals.

8. A system according to claim 4 wherein said third means is conditioned to record said current time period under control of said first approval signals.

9. A system for use with credit cards, or the like, which include a changeable recording medium, to limit authorization of uses to a predetermined limit of transactions, recurring during specified time periods, comprising:

means for sensing time-representative signals and use-representative signals from said recording medium on said card;

means for providing current time signals indicative of a current one of said time periods;

one means for comparing said time-representative signals with said current time signals to provide first approval signals if said time signals indicate a favorable dissimilarity;

further means, operatively effective in the absence of said first approval signals, for comparing said userepresentative signals in relation to said predetermined limit to provide second approval signals upon detection of a favorable dissimilarity; and means, operatively effective under control of said means for comparing, for manifesting approval and for recording said current time signals as said time-representative signals and also recording fresh use-representative signals on said recording medium of said card, said fresh use-representative signals alternatively being indicative of a selected combination of values indicative of said predetermined limit and said use-representative signals with a current one of said transactions.

10. A system according to claim 9 further including: means for providing current use signals indicative of said one of said transactions and wherein said means for manifesting approval and recording includes means for arithmetically combining said current use signals and said use-representative signals operatively conditioned by said second approval signals.

11. A system according to claim 9 wherein: said means operatively effective under control of said means for comparing is controlled by said means for comparing time-representative signals to record time-representative signals and is controlled by said means for testing use-representative signals to record use-representative signals.

12. In a system for controlling the aggregate use of a credit card or the like which bears a recording medium, whereby the card is to have a use limit during any of a series of specific time periods and wherein said system includes sensing means for sensing signals from said recording medium, and means for recording signals on said recording medium, the improvement which comprises:

time means for indicating a current one of said time periods;

means coupled to said sensing means for providing use-related signals and time-related signals indicative of a prior aggregate use of said card during a specified period of prior use of said card;

means coupled to said time means, for processing said use-related signals and said time-related signals to provide approval signals upon a detection that the use of said card during said current one of said time periods is within said limited use; and means coupled to said means for recording, controlled by said means for processing, for providing signals to indicate a selected combination of said use limit with representations of the use of said card during said current one of said time intervals.

13. A system according to claim 12 wherein:
said use-related signals are representative of monetary values.

14. A system according to claim 12 wherein:
means for providing use-related signals comprises an input apparatus for generating digital signals indicative of monetary values.

15. A system according to claim 9 further including means for sensing identification signals from said recording medium on said card to identify the assigned card holder.

16. A system according to claim 15 further including data storage means for registering identification signals and further including means for testing said identification signals from said recording means against said identification signals from said data storage means to inhibit said means for manifesting in the event of an unfavorable comparison.

17. A system according to claim 16 further including means for varying said predetermined limit under control of signals from said data storage means.

* * * * *

UNITED STATES PATENT AND TRADEMARK OFFICE
CERTIFICATE OF CORRECTION

PATENT NO. : 3,891,830
DATED : June 24, 1975
INVENTOR(S) : Robert N. Goldman

It is certified that error appears in the above-identified patent and that said Letters Patent are hereby corrected as shown below:

| Column | Line | |
|---|---|---|
| 2  | 56 | "e.f." should be --e.g.--; |
| 2  | 58 | "bounded" should be --bonded--; |
| 5  | 19 | "SO" should be --SØ--; |
| 6  | 49 | "for" after "data" should be --or--; |
| 6  | 67 | "trun" should be --turn--; |
| 7  | 42 | "arbituarily" should be --arbitrarily--; |
| 7  | 45 | "too" should be --to--; |
| 10 | 10 | "SO" should be --SØ--; |
| 10 | 22 | "R2" should be --R2-R9--; |
| 11 | 16 | '"on" gate' should be --"or" gate--; |
| 13 | 4  | "as" should be --at--; |
| 14 | 13 | "In" should be --If--; |
| 14 | 25 | "Mz" should be --M3--; and |
| 16 | 50 | "userepresentative" should be --use-representative--. |

Signed and Sealed this seventh Day of October 1975

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,891,830
DATED : June 24, 1975
INVENTOR(S) : Robert N. Goldman

It is certified that error appears in the above-identified patent and that said Letters Patent are hereby corrected as shown below:

In the drawings, Figure 6b, the labeled input to the gate 311 should read --D5-D9--.

Signed and Sealed this

Tenth Day of August 1976

[SEAL]

Attest:

RUTH C. MASON
Attesting Officer

C. MARSHALL DANN
Commissioner of Patents and Trademarks

Disclaimer 3,891,830.—*Robert N. Goldman*, Pacific Palisades, Calif. CREDIT VERIFICATION SYSTEM. Patent dated June 24, 1975. Disclaimer filed Dec. 8, 1977, by the assignee, *Telecredit, Inc.*

The term of this patent subsequent to Oct. 5, 1988 has been disclaimed.

[*Official Gazette March 14, 1978.*]